J. G. LEFFINGWELL.
Gas Cock.
No. 1,931.
Reissued April 11, 1865.
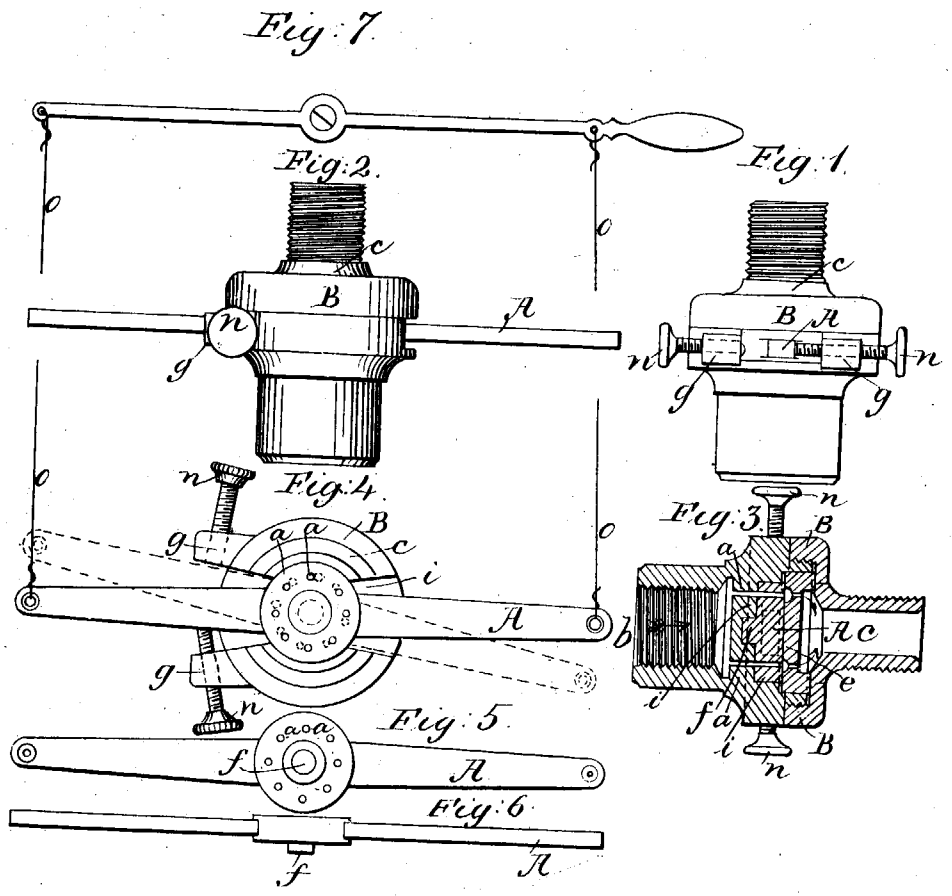
Witnesses.
W. H. Gooding
Charles Schmidt
Inventor.
J. G. Leffingwell
N. PETERS, Photo-Lithographer, Washington, D. C.

UNITED STATES PATENT OFFICE.

JOHN G. LEFFINGWELL, OF NEWARK, NEW JERSEY.

IMPROVEMENT IN GAS-COCKS.

Specification forming part of Letters Patent No. 461, dated February 19, 1861; Reissue No. 1,931, dated April 11, 1865.

*To all whom it may concern:*

Be it known that I, JOHN G. LEFFINGWELL, of the city of Newark, in the county of Essex and State of New Jersey, have invented certain Improvements in Gas-Cocks; and I do hereby declare the following to be a full and exact description thereof, reference being had therein to the drawings which accompany this specification and make part of the same.

The nature of my improvement consists in providing means for an instantaneous positive control of the flow of the gas to the burners, and for placing that control in any desired convenient location.

In the drawings, Figure 1 shows a side view of the gas-cock endwise of the lever; Fig. 2, a side view lengthwise of the lever. Fig. 3 is a sectional view sidewise. Fig. 4 shows the face of the main body of the cock with the valve-lever in place as seen when the coupling joint is removed. Fig. 5 is the valve-lever. Fig. 6 is an edgewise view of the same. Fig. 7 is the hand-lever, the same letters referring to the same parts in each figure.

The letter *a* designates the ports through the valve-lever A corresponding with the ports in the main body of the cock. When the lever is in the position in the drawings, the dotted lines show the ports closed by turning the lever A the gas entering through the hollow screw *b* passes through the ports *a* and out through the jointed coupling-piece *c*. The coupling B screws onto the main body of the cock and holds the coupling-piece *c* to a tight joint upon the lever-valve A, at *e*. A circular piece, *f*, projects from the under side of the lever-valve, and, fitting a recess in the main body of the cock, forms a pivot on which the lever-valve revolves or turns. The distance to which the lever A can turn is regulated by set-screws *w*, tapped through the hubs *g*. In any desired or convenient place the hand-lever, Fig. 7, is placed, and a connection by wires *o* or other means is made with the valve-lever of the gas-cock, and the set-screws can be placed so as to operate on the hand-lever if so required.

As in all large audience-rooms it is an object to economize in the consumption of gas, which is done by reducing the flow to the least degree that will remain ignited, the ability to do so at the option of the attendant without the common accident of extinguishing in the attempt is by the above improvement rendered certain, as is also the supply to the burners, so that no more than can be entirely consumed can be admitted.

In lodge and other society meeting-rooms, when change in light during proceedings is required, the necessity of an especial attendant is obviated by placing the handle-lever at the convenience of the master of ceremonies. Its convenience in billiard-rooms, in cigar-stores, and in jewelers' shops is also apparent.

What I claim as new of my invention, and desire to secure by Letters Patent, is—

1. A set-screw, in combination with a lever and gas cock, to prevent the flame from being extinguished, substantially as described.

2. A set-screw, in combination with a lever and gas-cock, to prevent too great a flow of gas to the burner, substantially as described.

JOHN G. LEFFINGWELL.

Witnesses:

J. C. SMITH,

FRED. B. GINN.